(12) United States Patent
Sakata et al.

(10) Patent No.: US 11,878,248 B2
(45) Date of Patent: Jan. 23, 2024

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventors: Shinpei Sakata, Tokyo (JP); Youichiro Miyake, Tokyo (JP); Gautier Boeda, Tokyo (JP); Gustavo Martins, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 166 days.

(21) Appl. No.: 17/545,703

(22) Filed: Dec. 8, 2021

(65) Prior Publication Data

US 2022/0176249 A1 Jun. 9, 2022

(30) Foreign Application Priority Data

Dec. 8, 2020 (JP) ................................. 2020-203410

(51) Int. Cl.
*A63F 13/57* (2014.01)
*A63F 13/35* (2014.01)

(52) U.S. Cl.
CPC .............. *A63F 13/57* (2014.09); *A63F 13/35* (2014.09)

(58) Field of Classification Search
CPC .......... A63F 13/57; A63F 13/35; A63F 13/55; A63F 13/58
USPC ........................................................ 463/42
See application file for complete search history.

(56) References Cited

U.S. PATENT DOCUMENTS

| | | | | |
|---|---|---|---|---|
| 10,646,778 | B2* | 5/2020 | Matsushita | ........... A63F 13/335 |
| 2016/0346697 | A1* | 12/2016 | Tanabe | ..................... A63F 13/70 |
| 2019/0118092 | A1* | 4/2019 | Sensui | ..................... A63F 13/58 |
| 2019/0250773 | A1* | 8/2019 | Miyaki | ................. A63F 13/212 |

(Continued)

FOREIGN PATENT DOCUMENTS

| | | |
|---|---|---|
| JP | 2012016523 A | 1/2012 |
| JP | 2019095973 A | 6/2019 |

(Continued)

OTHER PUBLICATIONS

[English Translation] Notification of Reasons for Refusal for Japanese Patent Application No. 2020-203410 dated Dec. 21, 2021, pp. all.

*Primary Examiner* — Michael A Cuff
(74) *Attorney, Agent, or Firm* — Dorsey & Whitney LLP

(57) ABSTRACT

A non-transitory computer-readable medium including a video game processing program for causing a server to select an action regarding an object of a character on a basis of predetermined selection criteria is provided. At least one usage purpose is set to the object as an action. The functions include: an extracting function configured to extract a similar object similar to a new object among selection criterion stored object, the character having already stored selection criteria for each selection criterion stored objects; and an inheriting function configured to set a selection probability of each action in the selection criteria stored so as to be associated with the new object based on a selection probability of each action in the selection criteria stored so as to be associated with the similar object with respect to at least actions set in common between the similar and new objects.

11 Claims, 10 Drawing Sheets

(56) References Cited

U.S. PATENT DOCUMENTS

| | | | |
|---|---|---|---|
| 2021/0275922 A1* | 9/2021 | Starich | A63F 13/86 |
| 2021/0312684 A1* | 10/2021 | Zimmermann | G02B 27/01 |
| 2021/0327112 A1* | 10/2021 | Palmaro | A63F 13/60 |
| 2021/0406575 A1* | 12/2021 | Wiggeshoff | G06V 20/647 |
| 2022/0176243 A1* | 6/2022 | Sakata | A63F 13/45 |
| 2023/0256325 A1* | 8/2023 | Wood | A63F 13/215 |
| | | | 463/37 |

FOREIGN PATENT DOCUMENTS

| | | | | |
|---|---|---|---|---|
| JP | 2020146574 A | 9/2020 | | |
| JP | 2020185208 A | 11/2020 | | |
| WO | WO-2019143933 A1 * | 7/2019 | | A63F 13/533 |

* cited by examiner

Fig. 15

ONE EXAMPLE OF ITEM DATA

|  | NAME | SIZE | WEIGHT | SHAPE |
|---|---|---|---|---|
| ITEM X | BAT | 40 | 1000 | ROD SHAPE |
| ITEM Y | IRON SWORD | 40 | 2000 | ROD SHAPE |
| ITEM Z | WOODEN STICK | 40 | 500 | ROD SHAPE |

Fig. 16

ONE EXAMPLE OF DEGREE OF SIMILARITY OF EACH ITEM WITH RESPECT TO ITEM A

|  | DEGREE OF SIMILARITY | |
|---|---|---|
| ITEM A | 100% | ▭ |
| ITEM B | 80% | ▭ |
| ITEM C | 25% | ▭ |
| ITEM D | 10% | ▭ |
| ITEM E | 20% | ▭ |
| ITEM F | 5% | ▯ |
| ITEM G | 60% | ▭ |
| ITEM H | 20% | ▭ |

Fig. 17

SELECTION CRITERIA OF ITEM A (UPDATED BY LEARNING)

| ACTION | INHERITANCE SOURCE ITEM LOTTERY PROBABILITY | |
|---|---|---|
| THROW | 30% | |
| EAT | 50% | |
| BURN | 20% | |
| LIFT | 0% | |
| TOTAL | 100% | |

+

SELECTION CRITERIA OF ITEM B (INITIAL SETTING STATE)

| ACTION | INHERITANCE DESTINATION ITEM LOTTERY PROBABILITY | |
|---|---|---|
| THROW | 0% | |
| EAT | 34% | |
| BURN | 33% | |
| LIFT | 33% | |
| TOTAL | 100% | |

⇩

Lottery probability value of overlapping action is added.
The total lottery probability value becomes an invalid value.

| ACTION | INHERITANCE DESTINATION ITEM LOTTERY PROBABILITY | |
|---|---|---|
| THROW | 0% | |
| EAT | 84% | |
| BURN | 53% | |
| LIFT | 33% | |
| TOTAL | 170% | |

⇩

It is normalized so that the total lottery probability value is 100 %.

| ACTION | INHERITANCE DESTINATION ITEM LOTTERY PROBABILITY | |
|---|---|---|
| THROW | 0% | |
| EAT | 49% | |
| BURN | 31% | |
| LIFT | 19% | |
| TOTAL | 100% | |

NON-TRANSITORY COMPUTER-READABLE MEDIUM AND VIDEO GAME PROCESSING SYSTEM

CROSS-REFERENCE TO RELATED APPLICATION

The present application claims priority to and the benefit of Japanese Patent Application No. 2020-203410 filed on Dec. 8, 2020, the disclosure of which is expressly incorporated herein by reference in its entirety for any purpose.

BACKGROUND

At least one of embodiments of the present invention relates to a technique of controlling an action of a character to select an action regarding an item of the character on the basis of predetermined selection criteria for determining which action is to be selected for an object to which at least one usage purpose (for example, an action) is set.

Conventionally, in video games, an action of a character has been automatically controlled by artificial intelligence (AI).

For example, Japanese Patent Application Publication No. 2019-095973 discloses an information processing apparatus that includes: an expression learning unit configured to learn a feature vector representing a feature of each object on the basis of a game log, the game log indicating a game progress history of a player related to an electronic game using a plurality of objects and including a usage result of a plurality of object; and a strategy learning unit configured to use at least the game log and the feature vector of each of the objects, which is learned by the expression learning unit, to cause an artificial intelligence agent, which plays the electronic game, to learn strategy regarding usage of the plurality of object.

SUMMARY

Here, in a video game, there is a case where at least one usage purpose is set to an item (or an object) and an action corresponding to the usage purpose is set so that a character can carry out the action. For example, it is conceivable that an action "swing downward", an action "thrust", an action "throw (like javelin throw)", and an action "flourish (while being in a sheath)" are set for an item called "Japanese sword" so that any of them can be carried out. In a case where a character obtains such an item by which at least one action can be carried out, various algorithms for determining which action the character is to be caused to carry out can be set. However, for example, it is conceivable to determine whether any action is selected on the basis of a selection probability.

Further, it is also conceivable to execute learning in which the selection probability is changed on the basis of evaluation of an execution result of the selected action.

Conventionally, such learning regarding the selection probability of an action against an item has been executed for each item. Namely, in a case where a "wooden sword" that can be handled in the similar manner by a user is first obtained in a state where learning about a "Japanese sword" is caused to proceed to an extent, the learning about the "Japanese sword" cannot be utilized for the "wooden sword", and the user is required to execute learning about the "wooden sword" again from the beginning. Namely, in a case where an item that has a high degree of similarity to another item whose learning is caused to proceed to an extent is obtained, the user expects that the item will be used in the similar manner due to the high degree of similarity thereof. However, since the user obtains the item for the first time and learning about the item is not caused to proceed, the action expected by the user cannot be executed, and there is a fear that behavior of a character may seem unnatural when viewed from the user.

It is an object of at least one of embodiments of the present disclosure to solve the problem described above, and to provide a video game processing program and a video game processing system capable of setting selection criteria for a new object on the basis of selection criteria of a similar object thereof.

According to one non-limiting aspect of the present disclosure, there is provided a non-transitory computer-readable medium including a video game processing program for causing a server to perform functions to select an action regarding an object of a character on a basis of predetermined selection criteria. Here, at least one usage purpose is set to the object as an action.

The functions include an extracting function configured to extract a similar object similar to an object newly obtained by a character as a new object among one or more objects as selection criterion stored objects, the character having already stored selection criteria for each of the selection criterion stored objects.

The functions also include an inheriting function configured to set a selection probability of each of actions in the selection criteria stored so as to be associated with the new object on a basis of a selection probability of each of actions in the selection criteria stored so as to be associated with the similar object with respect to at least actions set in common between the similar object and the new object.

According to another non-limiting aspect of the present disclosure, there is provided a video game processing system for performing functions to select an action regarding an object of a character on a basis of predetermined selection criteria. Here, at least one usage purpose is set to the object as an action. The video game processing system includes a communication network, a server, and the user terminal.

The video game processing system includes an extractor configured to extract a similar object similar to an object newly obtained by a character as a new object among one or more objects as selection criterion stored objects, the character having already stored selection criteria for each of the selection criterion stored objects.

The video game processing system also includes an inheritor configured to set a selection probability of each of actions in the selection criteria stored so as to be associated with the new object on a basis of a selection probability of each of actions in the selection criteria stored so as to be associated with the similar object with respect to at least actions set in common between the similar object and the new object.

According to still another non-limiting aspect of the present disclosure, there is provided a non-transitory computer-readable medium including a video game processing program for causing a user terminal to perform functions to select an action regarding an object of a character on a basis of predetermined selection criteria. Here, at least one usage purpose is set to the object as an action.

The functions include an extracting function configured to extract a similar object similar to an object newly obtained by a character as a new object among one or more objects as selection criterion stored objects, the character having already stored selection criteria for each of the selection criterion stored objects.

The functions also include an inheriting function configured to set a selection probability of each of actions in the selection criteria stored so as to be associated with the new object on a basis of a selection probability of each of actions in the selection criteria stored so as to be associated with the similar object with respect to at least actions set in common between the similar object and the new object.

According to each of the embodiments of the present application, one or two or more shortages are solved.

BRIEF DESCRIPTION OF DRAWINGS

The foregoing and other objects, features and advantages of the present disclosure will become more readily apparent from the following detailed description of preferred embodiments of the present disclosure that proceeds with reference to the appending drawings:

FIG. 15 is an explanatory diagram for explaining one example of information to be used corresponding to at least one of the embodiments of the present disclosure;

FIG. 16 is an explanatory diagram for explaining one example of information to be used corresponding to at least one of the embodiments of the present disclosure; and FIG. 17 is an explanatory diagram for explaining one example of information to be used corresponding to at least one of the embodiments of the present disclosure.

DETAILED DESCRIPTION

Hereinafter, examples of embodiments according to the present disclosure will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
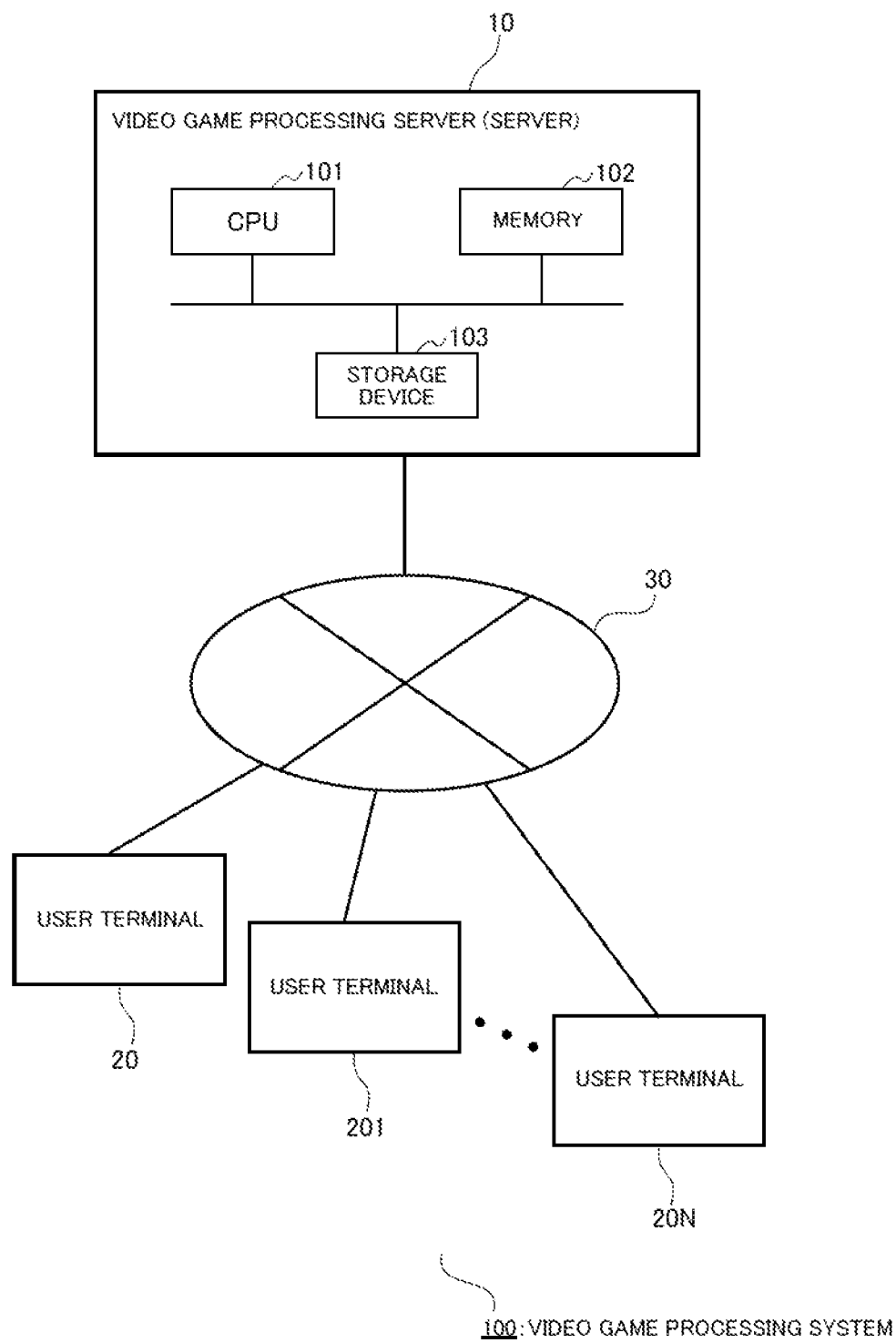
FIG. 1 is a block diagram illustrating an example of a configuration of a video game processing system corresponding to at least one of the embodiments of the present disclosure.

FIG. 1 is a block diagram illustrating an example of a configuration of a video game processing system corresponding to at least one of the embodiments of the present disclosure. As illustrated in FIG. 1, a video game processing system 100 includes a video game processing server 10 (hereinafter, referred to as a "server 10") and user terminals 20, and 201 to 20N ("N" is an arbitrary integer) respectively used by users of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10 and the plurality of user terminals 20 and 201 to 20N is connected to a communication network 30 such as the Internet. In this regard, although it is not illustrated in the drawings, the plurality of user terminals 20 and 201 to 20N is connected to the communication network 30 by executing data communication with base stations managed by a telecommunication carrier by means of a radio communication line.

The video game processing system 100 includes the server 10 and the plurality of user terminals 20 and 201 to 20N, whereby various kinds of functions for executing various kinds of processing in response to an operation of the user are performed.

The server 10 is managed by an administrator of the video game processing system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. A configuration of the server 10 is not limited particularly so long as the server 10 includes a general configuration for executing various kinds of processes as a computer, such as a control unit and a communication unit. Hereinafter, an example of a hardware configuration of the server 10 will be described briefly.

As illustrated in FIG. 1, the server 10 at least includes a CPU (Central Processing Unit) 101, a memory 102, and a storage device 103.

The CPU 101 is a central processing unit configured to execute various kinds of calculations and controls. Further, in a case where the server 10 includes a GPU (Graphics Processing Unit), a part of the various kinds of calculations and controls may be executed by the GPU. The server 10 appropriately executes, by the CPU 101, various kinds of information processing required to control a video game by using data read out onto the memory 102, and stores obtained processing results in the storage device 103 as needed.

The storage device 103 has a function as a storage medium for storing various kinds of information. A configuration of the storage device 103 is not limited particularly. However, it is preferable that the storage device 103 is configured so as to be capable of storing all of the various kinds of information required to control the video game from the viewpoint of reducing a processing load on each of the plurality of user terminals 20 and 201 to 20N. As such examples, there are an HDD and an SSD. However, a storage unit for storing the various kinds of information may be provided with a storage region in a state that the server 10 can access the storage region, for example, and may be configured so as to have a dedicated storage region outside the server 10.

Figure 2:
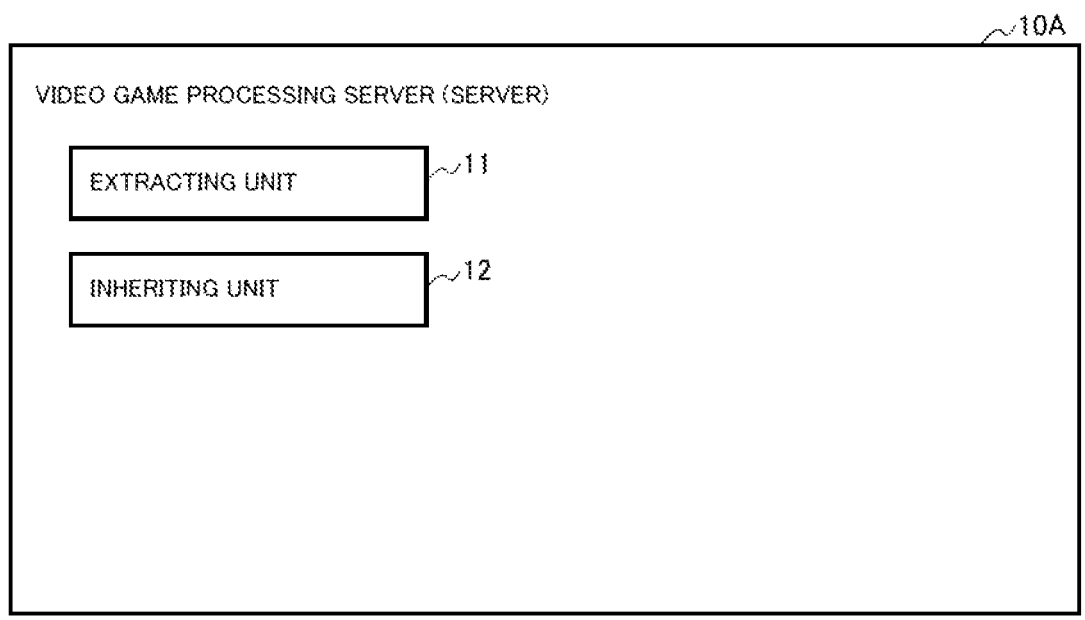
FIG. 2 is a block diagram illustrating a configuration of a server corresponding to at least one of the embodiments of the present disclosure.

FIG. 2 is a block diagram illustrating a configuration of a video game processing server corresponding to at least one of the embodiments of the present disclosure. Namely, FIG. 2 is a block diagram illustrating one example of a configuration of a video game processing server 10A (hereinafter, referred to as a "server 10A"). As illustrated in FIG. 2, the server 10A at least includes an extracting unit 11 and an inheriting unit 12.

The extracting unit 11 has a function to extract a similar object similar to an object newly obtained by a character (hereinafter, referred to as a "new object") among one or more objects for each of which the character has already stored selection criteria (hereinafter, referred to as "selection criterion stored object").

Here, the selection criteria mean criteria for selecting an action that the character is caused to carry out when the character is caused to use an object to which at least one usage purpose (that is, an action) is set. It is conceivable that the selection criteria are determined by a selection probability set to each of the one or more actions set to the object. In the present embodiment, it is assumed that selection criteria for each object are stored for each character.

Further, the object means a virtual object that appears in the video game. In particular, the object according to the present embodiment becomes a target used by the character. The at least one usage purpose (the action) is set to the object. In a case where there is a plurality of actions that can be carried out by the character, an action that the character is caused to carry out is determined on the basis of character the selection criteria. As the action, "throw", "eat", or "burn" is set, for example.

Further, the character means something that appears in the video game to take an action. The character includes something that takes an action on the basis of a user operation and something that autonomically takes an action regardless of a user operation. However, with respect to at least selection of an action against an object, the character according to the present embodiment autonomically selects such an action regardless of any user operation. The character that autonomically takes an action is not limited particularly. Such a character may be a non-player character (NPC) that does not completely receive an operation of the user in the video game, or may be a character that receives an operation of the user in a partial status and does not receive an operation of the user in the other status. As an example of the character that autonomically takes an action, there is one that autonomically recognizes object(s) around it, and makes a decision to take an action against any object.

Further, one or more objects for each of which the character has already stored selection criteria (that is, the selection criterion stored object) means an object or objects for which selection criteria are newly stored or updated on the basis of any event or the like in the video game in addition to an object for which selection criteria are stored by inheritance processing (will be described later). Here, the event includes both a case of indicating information processing that is generated by satisfying a predetermined condition in internal processing of the video game, and a case of indicating an event that is generated for the character or the like in the story of the video game. Further, as initial settings of the video game, there may be an object that is treated as a selection criterion stored object from the beginning for a certain character. Thus, the "event or the like" are used in order to include objects to be treated as the selection criterion stored object on the basis of a condition other than the event. On the other hand, the new object means an object whose selection criteria have not been newly stored and updated yet. Namely, an object that does not have selection criteria as an initial setting and for which selection criteria have not been newly stored, or an object for which selection criteria stored as an initial setting have never been updated is expressed as a new object. Further, the object for which selection criteria have not been newly stored and updated is defined as the new object. However, even an object for which selection criteria have been newly stored and updated may be treated as a new object depending upon conditioning in the video game.

Further, similarity with respect to objects means a state where two objects to be compared with each other have many common points in terms of properties of the objects. The similar object means an object whose degree of similarity satisfies predetermined standards. The extracting unit 11 executes a process of extracting a selection criterion stored object similar to the new object newly obtained by the character as the similar object. A condition to determine whether they are similar to each other or not can be set appropriately.

The inheriting unit 12 has a function to set a selection probability of each of actions in the selection criteria stored so as to be associated with the new object on the basis of a selection probability of each of actions in the selection criteria stored so as to be associated with the similar object with respect to at least actions set in common between the similar object and the new object.

The inheritance processing is a process of setting selection criteria of a new object on the basis of selection criteria of a similar object. The concrete processing content may be any method so long as it is set on the basis of the selection criteria of the similar object. For example, it is conceivable a process so that a selection probability of each action in selection criteria of a new object approaches a selection probability of each corresponding action in selection criteria of a similar object. As a concrete example of the process, there is a process in which normalization processing is executed so that for at least actions set in common, a value indicating a selection probability of each action in selection criteria of a similar object is added to a value of a selection probability of each corresponding action in selection criteria of a new object and a total of the values of the selection probabilities then becomes 100%. The selection criteria of the new object after the execution of the inheritance processing are stored in the storage device 103 as the selection criteria of the new object regarding the character. In this regard, the new object may be configured so as to include the selection criteria as an initial setting, or may be configured so as not to include selection criteria and store selection criteria only by inheritance processing for the first time. The inheritance processing by the inheriting unit 12 may be executed at timing when the character obtains an object, or may be executed at timing immediately before the character selects an action against an object. Namely, the inheritance processing by the inheriting unit 12 is executed when a predetermined start condition of the inheritance processing is satisfied.

Each of the plurality of user terminals 20, and 201 to 20N is managed by the user, and is configured by a communication terminal capable of playing a network delivery type game, such as a cellular telephone terminal, a PDA (Personal Digital Assistants), a portable game apparatus, or a so-called wearable device, for example. In this regard, the configuration of the user terminal that the video game processing system 100 can include is not limited to the example described above. Each of the user terminals 20, and 201 to 20N may be configured so that the user can recognize the content of the video game. As the other examples of the user terminal, there are one obtained by combining various kinds of communication terminals, a personal computer, and a stationary game apparatus.

Further, each of the plurality of user terminals 20, and 201 to 20N is connected to the communication network 30, and includes hardware (for example, a display device for displaying a browser screen or a game screen based on a coordinate and the like) and software for executing various kinds of processes by communicating with the server 10A. In this regard, each of the plurality of user terminals 20, and 201 to 20N may be configured so as to be able to directly communicate with each other without the server 10A.

Next, an operation of a video game processing system 100 (hereinafter, referred to as a "system 100") according to the present embodiment will be described.

Figure 3:
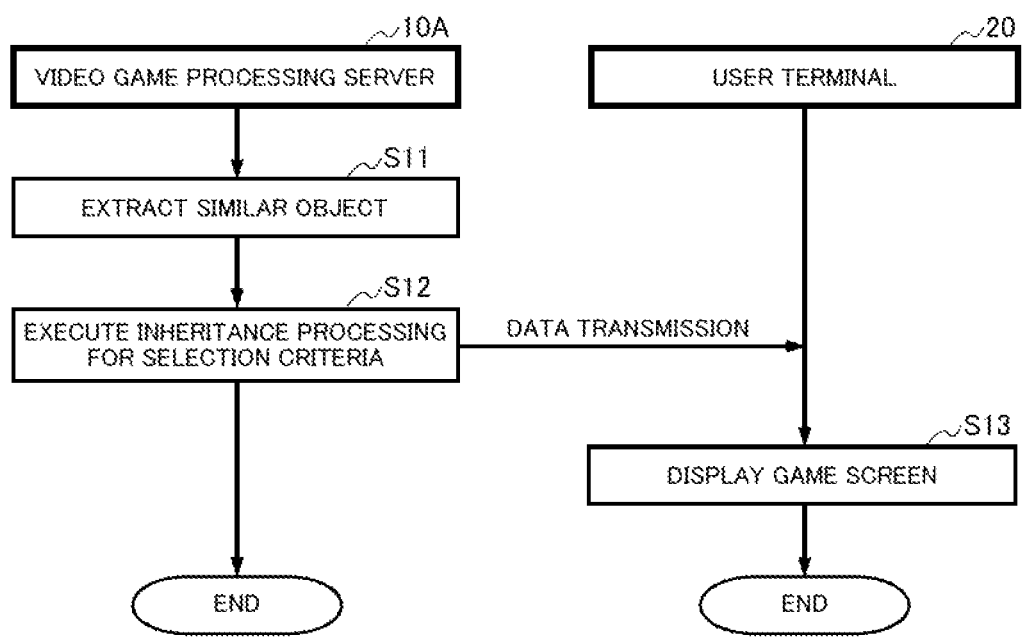
FIG. 3 is a flowchart illustrating an example of game processing corresponding to at least one of the embodiments of the present disclosure.

FIG. 3 is a flowchart illustrating an example of game processing corresponding to at least one of the embodiments of the present disclosure. In the game processing according to the present embodiment, processes related to a control of progress of the video game in response to an operation of the user of the user terminal 20 (hereinafter, referred to as the "terminal 20") are executed. Hereinafter, a case where the server 10A and the terminal 20 execute the game processing will be described as an example.

The game processing is started in a case where a start condition of inheritance processing for a new object is satisfied, for example. In a case where the start condition of the inheritance processing for the new object is satisfied, the server 10A first extracts a similar object similar to the new object (Step S11). Subsequently, the server 10A executes the inheritance processing from selection criteria of the similar object to selection criteria of the new object (Step S12). Subsequently, the server 10A stores the selection criteria of the new object after the inheritance processing is executed, and executes data transmission for reflecting an influence based on execution of the inheritance processing to the user terminal 20. Subsequently, the user terminal 20 receives data after the inheritance processing; causes a predetermined display device to display game screen to which the inheritance processing is reflected if needed (Step S13); and terminates the processes herein.

Figure 4:
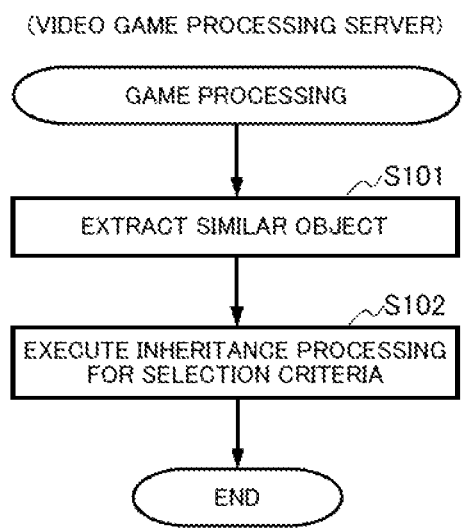
FIG. 4 is a flowchart illustrating an example of an operation of a server side in the game processing corresponding to at least one of the embodiments of the present disclosure.

FIG. 4 is a flowchart illustrating an example of an operation of the server 10A side in the game processing corresponding to at least one of the embodiments of the present disclosure. Here, an operation of the server WA in the system 100 will be described again.

The game processing is started in a case where a start condition of inheritance processing for a new object is satisfied, for example. In a case where the start condition of the inheritance processing for the new object is satisfied, the server 10A first extracts a similar object similar to the new object (Step S101). Subsequently, the server 10A executes the inheritance processing from selection criteria of the similar object to selection criteria of the new object (Step S102), and terminates the processes herein.

Figure 5:
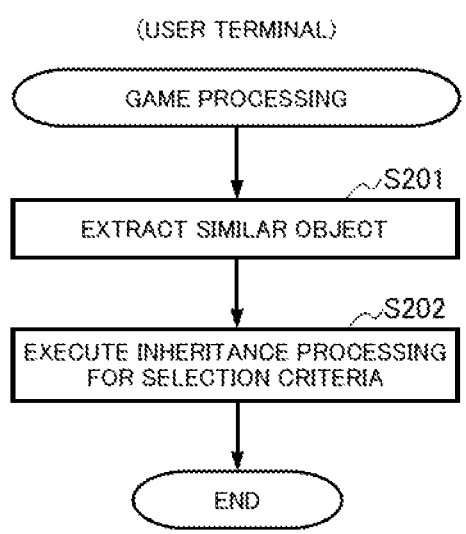
FIG. 5 is a flowchart illustrating an example of an operation of a user terminal side in the game processing corresponding to at least one of the embodiments of the present disclosure.

FIG. 5 is a flowchart illustrating an example of the terminal 20 side in the game processing corresponding to at least one of the embodiments of the present disclosure. Hereinafter, a case where the terminal 20 executes the game processing by a single body will be described as an example. In this regard, the configuration of the terminal 20 includes the similar functions to those of the server 10A except that the terminal 20 receives various kinds of information from the server 10A. For this reason, its explanation is omitted from a point of view to avoid repeated explanation.

The game processing is started in a case where a start condition of inheritance processing for a new object is satisfied, for example. In a case where the start condition of the inheritance processing for the new object is satisfied, the user terminal 20 first extracts a similar object similar to the new object (Step S201). Subsequently, the user terminal 20 executes the inheritance processing from selection criteria of the similar object to selection criteria of the new object (Step S202), and terminates the processes herein.

As explained above, as one side of the first embodiment, the server 10A that controls the character in the progress of the video game is configured so as to at least include the extracting unit 11 and the inheriting unit 12. Thus, the extracting unit 11 extracts the similar object similar to the object newly obtained by the character as the new object among the one or more objects for each of which the character has already stored selection criteria as the selection criterion stored object; and the inheriting unit 12 sets the selection probability of each of the actions in the selection criteria stored so as to be associated with the new object on the basis of the selection probability of each of the actions in the selection criteria stored so as to be associated with the similar object with respect to at least the actions set in common between the similar object and the new object. Therefore, it becomes possible to set the selection criteria for the new object on the basis of the selection criteria of the similar object.

Namely, by inheriting the selection criteria of the similar object, which is an existing object that has already stored the selection criteria, to the selection criteria of the new object, it becomes possible to bring selection tendency (that is, the selection probability) of an action in the new object closer to selection tendency (that is, the selection probability) of an action in the similar object. Therefore, even though it is a new object, it is possible to realize a process that meets expectation of the user to want to be able to cause the character to use the new object whose degree of similarity to an existing object is high in the similar manner to that of the existing object.

Second Embodiment

Figure 6:
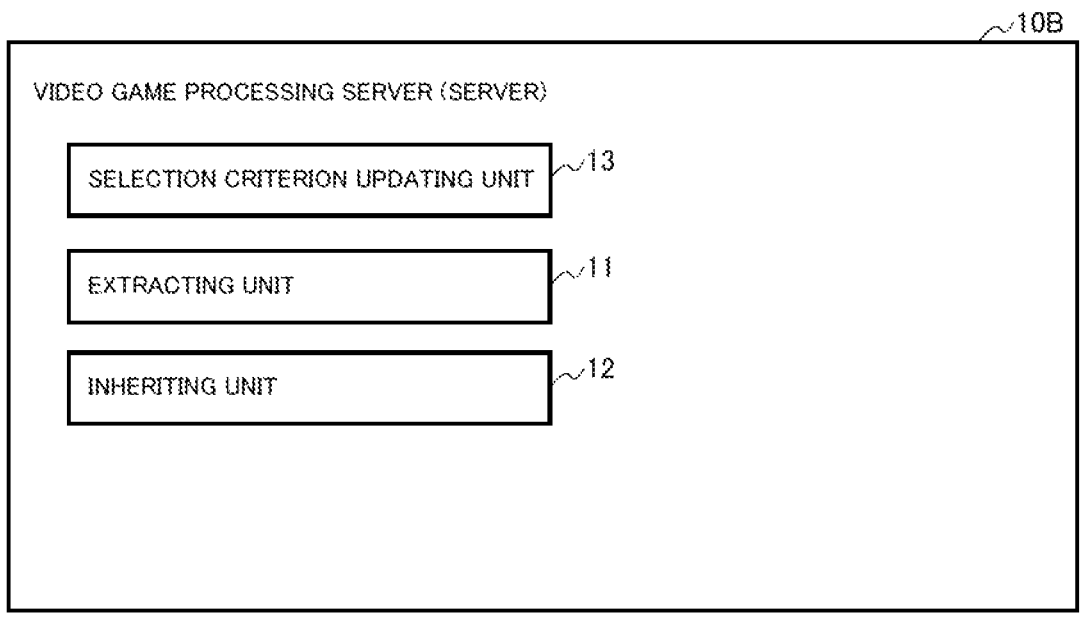
FIG. 6 is a block diagram illustrating a configuration of a server corresponding to at least one of the embodiments of the present disclosure.

FIG. 6 is a block diagram illustrating a configuration of a video game processing server corresponding to at least one of the embodiments of the present disclosure. A configuration of a video game processing server 10B (hereinafter, referred to as a "server 10B"), which is an example of the video game processing server 10 will be described with reference to FIG. 6. In the present embodiment, the server 10B at least includes a selection criterion updating unit 13, an extracting unit 11, and an inheriting unit 12.

The selection criterion updating unit 13 has a function to update and store, when a character carries out an action against an object, a selection probability of each of actions in selection criteria regarding the object on a basis of evaluation for the action.

Here, the evaluation for the action means value determination executed by a game system or a user with respect to an influence on game environment (or a world) or an influence on a game play result by the action carried out by the character. The evaluation may be one that is automatically executed by the game system, or one that is carried out by the user. For example, for the evaluation, various methods can be adopted, such as a method of scoring and evaluating an influence of an action carried out on a video game, and a method of selecting positive evaluation or negative evaluation about the action by the user.

Various methods can be adopted for an updating process of the selection criteria so long as the update is based on the evaluation. For example, the following method is conceivable. Namely, in a case where evaluation of an action carried out by a character is higher than a predetermined criterion, the selection criteria are updated so that a selection probability of the action becomes high. In a case where evaluation of an action carried out by the character is lower than the predetermined criterion, the selection criteria are updated so that the selection probability of the action becomes low. Further, when the selection probability of the action carried out by the character is changed, it is necessary to adjust a selection probability of each of the other actions. In this regard, timing of the updating process by the selection criterion updating unit 13 is not necessarily immediately after the action against the object is carried out, but the timing can be appropriately set to predetermined timing such as timing of a predetermined event in the video game, or timing when the user evaluates the action.

Figure 7:
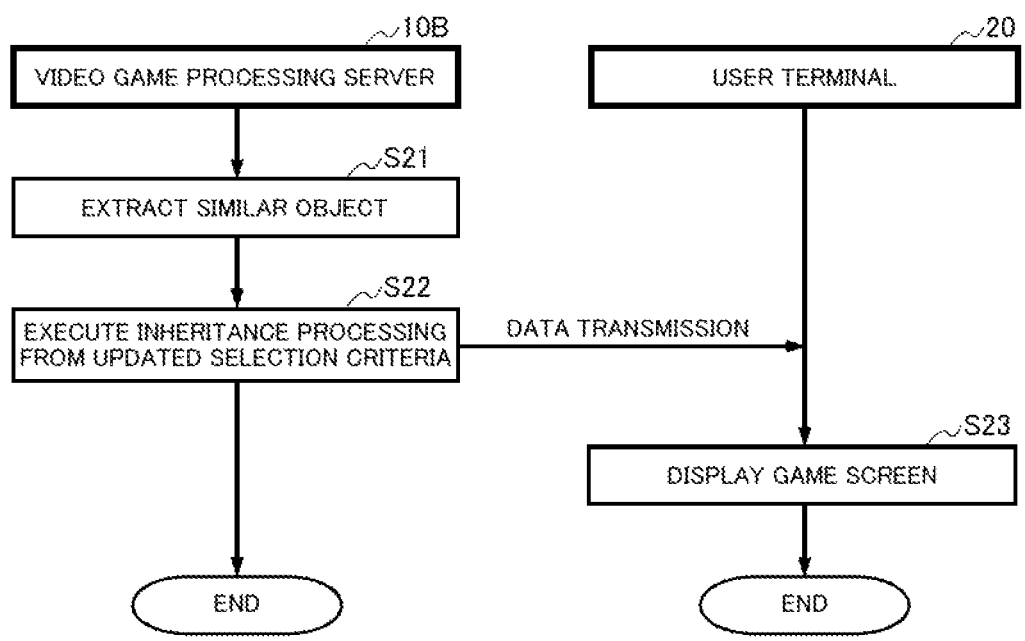
FIG. 7 is a flowchart illustrating an example of game processing corresponding to at least one of the embodiments of the present disclosure.

FIG. 7 is a flowchart illustrating an example of game processing corresponding to at least one of the embodiments of the present disclosure. In the game processing according to the present embodiment, processes related to a control of progress of the video game in response to an operation of the user of a user terminal 20 (hereinafter, referred to as a "terminal 20") are executed. Hereinafter, a case where the server 10B and the terminal 20 execute the game processing will be described as an example. In this regard, a flowchart illustrating an operation of each of the server 10B and the terminal 20 is omitted from a point of view to avoid repeated explanation.

The game processing is started in a case where a start condition of inheritance processing for a new object is satisfied, for example. In a case where the start condition of the inheritance processing for the new object is satisfied, the server 10B first extracts a similar object similar to the new object (Step S21). Subsequently, the server 10B executes the inheritance processing from selection criteria of the similar object for which an updating process was executed by the selection criterion updating unit 13 to selection criteria of the new object (Step S22). Subsequently, the server 10B stores the selection criteria of the new object after the inheritance processing is executed, and executes data transmission for reflecting an influence based on execution of the inheritance processing to the user terminal 20. Subsequently, the user terminal 20 receives data after the inheritance processing; causes a predetermined display device to display game screen to which the inheritance processing is reflected if needed (Step S23); and terminates the processes herein.

As explained above, as one side of the second embodiment, the server 10B that controls the character in the progress of the video game at least includes the selection criterion updating unit 13, the extracting unit 11, and the inheriting unit 12. Thus, the selection criterion updating unit 13 updates and stores, when the character carries out the action against the object, the selection probability of each of the actions in the selection criteria regarding the object on a basis of the evaluation for the action. Therefore, it becomes possible to inherit the selection criteria of the similar object updated on the basis of the evaluation to the selection criteria of the new object.

Namely, the selection criteria of the similar object for which the updating process is repeated due to usage thereof becomes selection criteria to which evaluation is reflected, that is, so-called advanced learning selection criteria. By inheriting these selection criteria to the selection criteria of the new object, it is possible to select an action for the new object on the basis of the selection criteria close to the advanced learning selection criteria. Therefore, even though it is a new object, it is possible to realize processing that meets expectation of the user, which the user wants the character to be capable of using an object whose degree of similarity with an existing object is high as well as the existing object.

Third Embodiment

Figure 8:
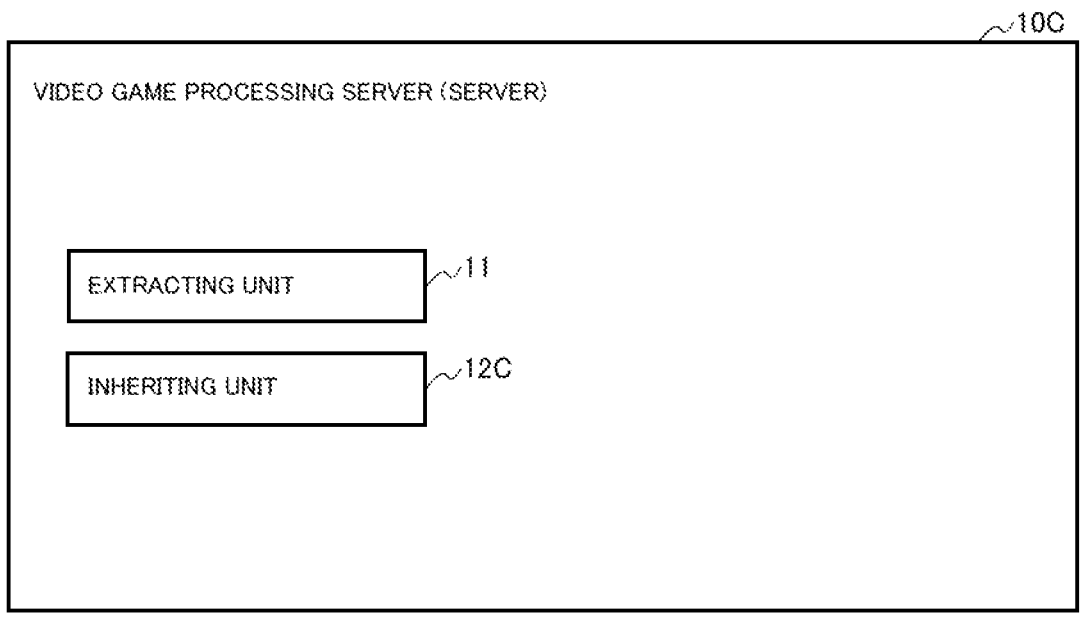
FIG. 8 is a block diagram illustrating a configuration of a server corresponding to at least one of the embodiments of the present disclosure.

FIG. 8 is a block diagram illustrating a configuration of a video game processing server corresponding to at least one of the embodiments of the present disclosure. A configuration of a video game processing server 10C (hereinafter, referred to as a "server 10C"), which is an example of the video game processing server 10, will be described with reference to FIG. 8. In the present embodiment, the server 10C at least includes an extracting unit 11 and an inheriting unit 12C.

The inheriting unit 12C has a function to execute inheritance processing for a selection probability of an action that can be carried out in common between a similar object and a new object. Namely, a selection probability of each action in selection criteria stored so as to be associated with the new object is set on the basis of a selection probability of each action in selection criteria that have been stores so as to be associated with a similar object with respect to the action that can be carried common therebetween. In this regard, when the inheritance processing is executed for the action that can be carried out in common, it does not prevent a selection probability of an action that is not common from fluctuating. For example, as a result of execution of normalization processing, it can be said that the selection probability of the action that is not common can vary.

Figure 9:
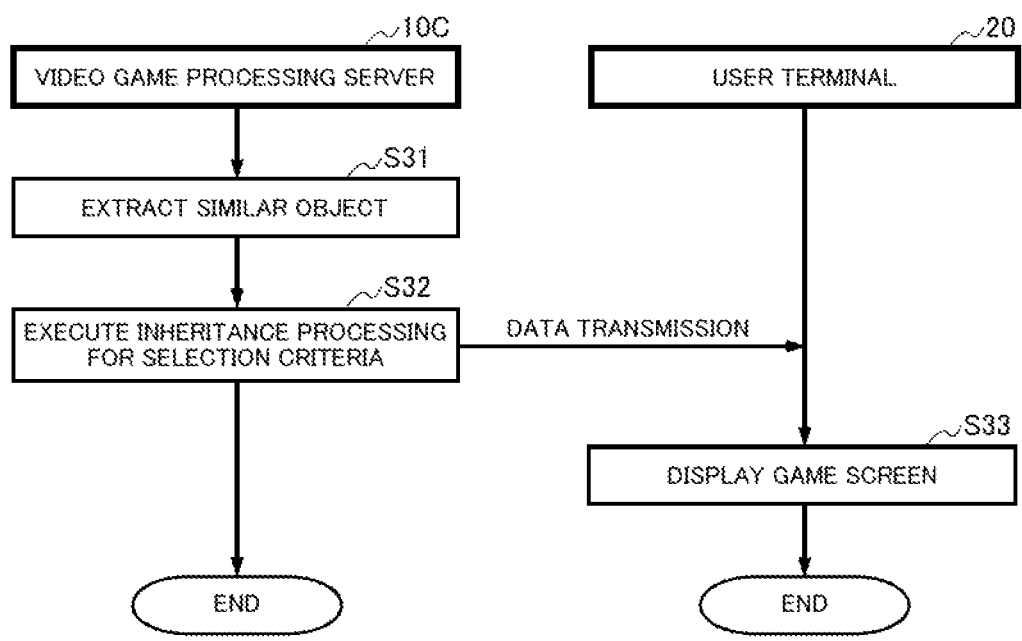
FIG. 9 is a flowchart illustrating an example of game processing corresponding to at least one of the embodiments of the present disclosure.

FIG. 9 is a flowchart illustrating an example of game processing corresponding to at least one of the embodiments of the present disclosure. In the game processing according to the present embodiment, processes related to a control of progress of the video game in response to an operation of the user of a user terminal 20 (hereinafter, referred to as a "terminal 20") are executed. Hereinafter, a case where the server 10C and the terminal 20 execute the game processing will be described as an example. In this regard, a flowchart illustrating an operation of each of the server 10C and the terminal 20 is omitted from a point of view to avoid repeated explanation.

The game processing is started in a case where a start condition of inheritance processing for a new object is satisfied, for example. In a case where the start condition of the inheritance processing for the new object is satisfied, the server 10C first extracts a similar object similar to the new object (Step S31). Subsequently, the server 10C executes the inheritance processing from selection criteria of the similar object to selection criteria of the new object with respect to an action that can be carried out in common between the similar object and the out in new object (Step S32). Subsequently, the server 10C stores the selection criteria of the new object after the inheritance processing is executed, and executes data transmission for reflecting an influence based on execution of the inheritance processing to the user terminal 20. Subsequently, the user terminal 20 receives data after the inheritance processing; causes a predetermined display device to display a game screen to which the inheritance processing is reflected if needed (Step S33); and terminates the processes herein.

As explained above, as one side of the third embodiment, the server 10C that controls the character in the progress of the video game at least includes the extracting unit 11 and the inheriting unit 12C. Thus, the inheriting unit 12C executes the inheritance processing for the selection probability of the action that can be carried out in common between the similar object and the new object. Therefore, it becomes possible to inherit the selection criteria of the similar object to the selection criteria of the new object with respect to the action that can be carried out in common between the similar object and the new object.

Namely, by inheriting the selection criteria between the similar object and the new object with respect to the action that can be carried out in common, the inheritance processing is executed for the selection probability of the common action even though the similar object and the new object include different actions from each other. Therefore, even though it is a new object, it is possible to realize processing that meets expectation of the user, which the user wants the character to be capable of using an object whose degree of similarity with an existing object is high as well as the existing object with respect to the common action.

Fourth Embodiment

Figure 10:
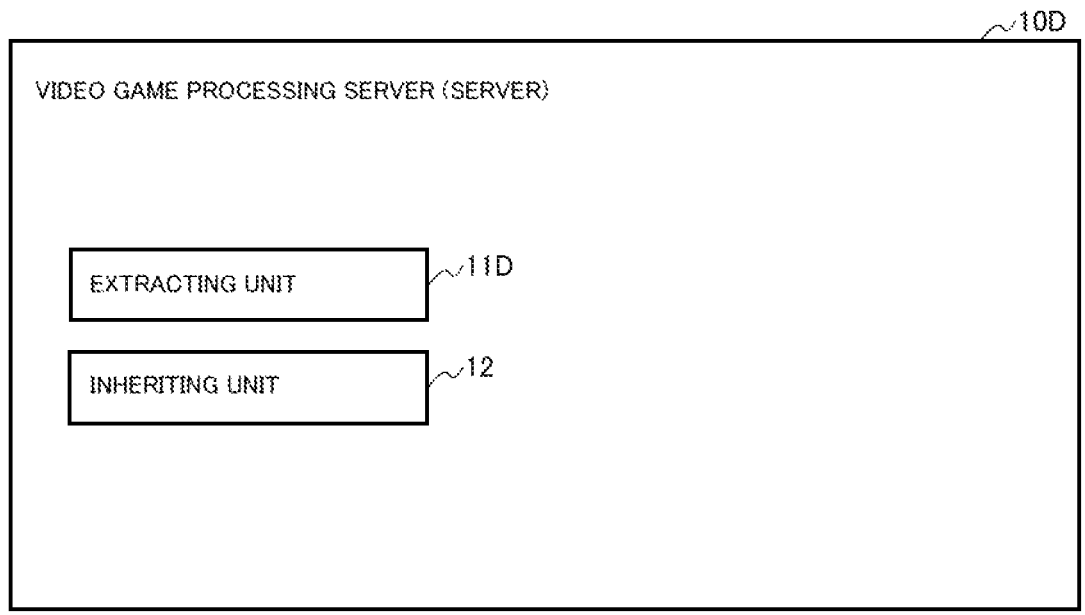
FIG. 10 is a block diagram illustrating a configuration of a server corresponding to at least one of the embodiments of the present disclosure.

FIG. 10 is a block diagram illustrating a configuration of a video game processing server corresponding to at least one of the embodiments of the present disclosure. A configuration of a video game processing server 10D (hereinafter, referred to as a "server 10D"), which is an example of the video game processing server 10, will be described with reference to FIG. 10. In the present embodiment, the server 10D at least includes an extracting unit 11D and the inheriting unit 12.

The extracting unit 11D has a function to calculate a degree of similarity between a new object and each of one or more selection criterion stored objects in accordance with a degree of matching of one or more items about properties of the object including at least one item, and extract a similar object on the basis of the degree of similarity.

Here, the properties of an object mean information indicating characteristics possessed by the object. The properties of the object may be anything so long as they are the information indicating the characteristics of the object. For example, a size, a shape, a weight and the like of the object can be considered. An element is set to each type of such information indicating the characteristics of the object. The calculation of a degree of similarity between objects is made by determining a degree of matching for each element set in this manner.

Figure 11:
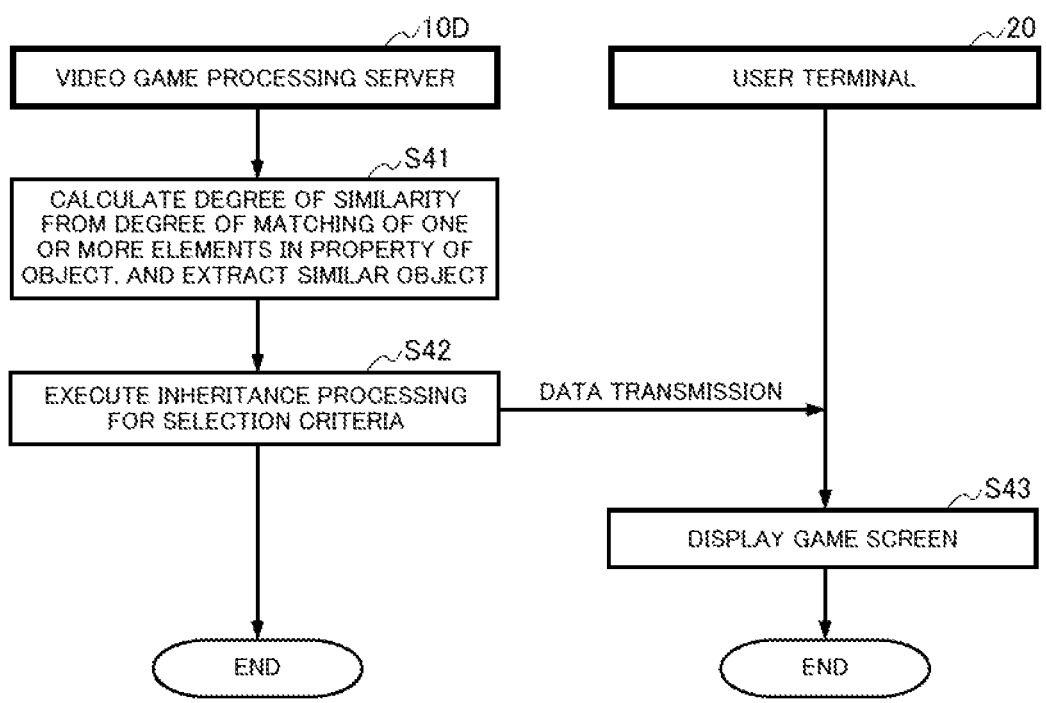
FIG. 11 is a flowchart illustrating an example of game processing corresponding to at least one of the embodiments of the present disclosure.

FIG. 11 is a flowchart illustrating an example of game processing corresponding to at least one of the embodiments of the present disclosure. In the game processing according to the present embodiment, processes related to a control of progress of the video game in response to an operation of the user of a user terminal 20 (hereinafter, referred to as a "terminal 20") are executed. Hereinafter, a case where the server 100 and the terminal 20 execute the game processing will be described as an example. In this regard, a flowchart illustrating an operation of each of the server 10D and the terminal 20 is omitted from a point of view to avoid repeated explanation.

The game processing is started in a case where a start condition of inheritance processing for a new object is satisfied, for example. In a case where the start condition of the inheritance processing for the new object is satisfied, the server 10D first calculates a degree of similarity between the new object and each of one or more selection criterion stored objects in accordance with a degree of matching of one or more elements about properties of the object, which are composed of at least one element, and extracts a similar object on the basis of the degree of similarity (Step S41). Subsequently, the server 10D executes the inheritance processing from selection criteria of the similar object to selection criteria of the new object (Step S42). Subsequently, the server 10D stores the selection criteria of the new object after the inheritance processing is executed, and executes data transmission for reflecting an influence based on execution of the inheritance processing to the user terminal 20. Subsequently, the user terminal 20 receives data after the inheritance processing; causes a predetermined display device to display a game screen to which the inheritance processing is reflected if needed (Step S43); and terminates the processes herein.

As explained above, as one side of the fourth embodiment, the server 10D that controls the character in the progress of the video game at least includes the extracting unit 11D and the inheriting unit 12. Thus, the extracting unit 11D calculate a degree of similarity between a new object and each of one or more selection criterion stored objects in accordance with a degree of matching of one or more elements about properties of the object, which are composed of at least one element, and extract a similar object on the basis of the degree of similarity. Therefore, it becomes possible to extract the similar object with high accuracy on the basis of the degree of similarity.

Namely, the similar objects each of which becomes an inheritance source for the new object can be extracted in order from one with the highest degree of similarity. Therefore, it becomes possible to inherit selection of an action for the new object after the inheritance processing is executed without causing a sense of discomfort similar to that of the similar object.

Fifth Embodiment

Figure 12:
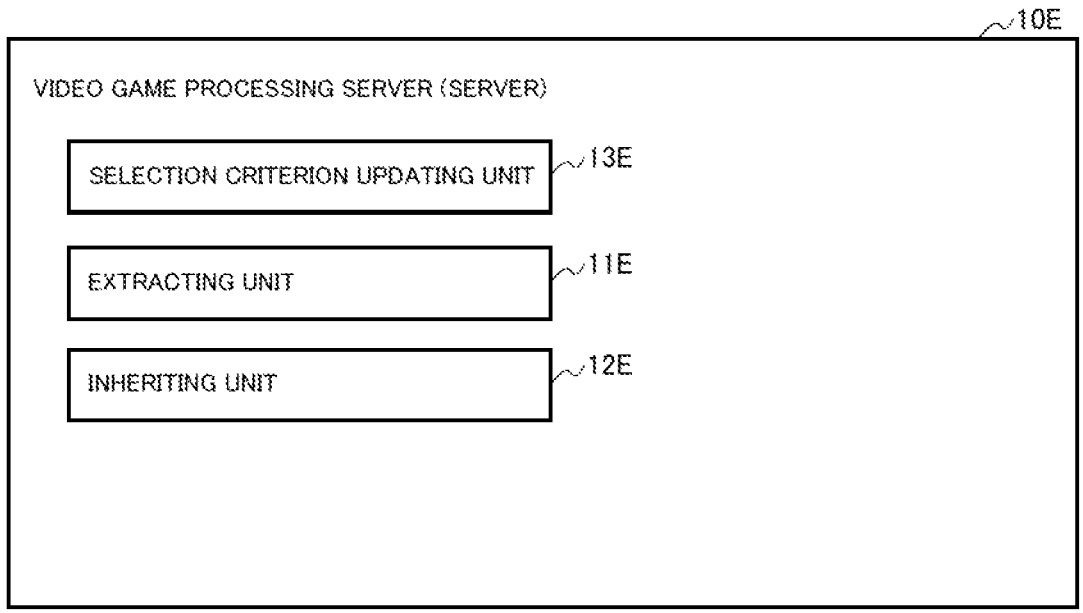
FIG. 12 is a block diagram illustrating a configuration of a server corresponding to at least one of the embodiments of the present disclosure.

FIG. 12 is a block diagram illustrating a configuration of a video game processing server 10E (hereinafter, referred to as a "server 10E"), which is an example of the video game processing server 10. In the present embodiment, the server 10E at least includes a selection criterion updating unit 13E, an extracting unit 11E, and an inheriting unit 12E.

The selection criterion updating unit 13E has a function to update and store, when a character carries out an action against an object, a selection probability of each of actions in selection criteria regarding the object on a basis of evaluation for the action.

Here, the evaluation for the action means value determination executed by a game system or a user with respect to an influence on game environment (or a world) or an influence on a game play result by the action carried out by the character. The evaluation may be one that is automatically executed by the game system, or one that is carried out by the user. For example, for the evaluation, various methods can be adopted, such as a method of scoring and evaluating an influence of an action carried out on a video game, and a method of selecting positive evaluation or negative evaluation about the action by the user.

Various methods can be adopted for an updating process of the selection criteria so long as the update is based on the evaluation. For example, the following method is conceivable. Namely, in a case where evaluation of an action carried out by a character is higher than a predetermined criterion, the selection criteria are updated so that a selection probability of the action becomes high. In a case where evaluation of an action carried out by the character is lower than the predetermined criterion, the selection criteria are updated so that the selection probability of the action becomes low. Further, when the selection probability of the action carried out by the character is changed, it is necessary to adjust a selection probability of each of the other actions. In this regard, timing of the updating process by the selection criterion updating unit 13E is not necessarily immediately after the action against the object is carried out, but the timing can be appropriately set to predetermined timing such as timing of a predetermined event in the video game, or timing when the user evaluates the action.

The extracting unit 11E has a function to extract a similar object similar to an object newly obtained by a character (hereinafter, referred to as a "new object") among one or more objects for each of which the character has already stored selection criteria (hereinafter, referred to as "selection criterion stored object"). Further, the extracting unit 11E has a function to calculate a degree of similarity between a new object and each of one or more selection criterion stored objects in accordance with a degree of matching of one or more elements about properties of the object, which are composed of at least one element, and extract a similar object on the basis of the degree of similarity.

Here, the selection criteria mean criteria for selecting an action that the character is caused to carry out when the character is caused to use an object to which at least one usage purpose (that is, an action) is set. It is conceivable that the selection criteria are determined by a selection probability set to each of the one or more actions set to the object. In the present embodiment, it is assumed that selection criteria for each object are stored for each character.

Further, the object means a virtual object that appears in the video game. In particular, the object according to the present embodiment becomes a target used by the character. The at least one usage purpose (the action) is set to the object. In a case where there is a plurality of actions that can be carried out by the character, an action that the character is caused to carry out is determined on the basis of character the selection criteria. As the action, "throw", "eat", or "burn" is set, for example.

Further, the character means something that appears in the video game to take an action. The character includes something that takes an action on the basis of a user operation and something that autonomically takes an action regardless of a user operation. However, with respect to at least selection of an action against an object, the character according to the present embodiment autonomically selects such an action regardless of any user operation. The character that autonomically takes an action is not limited particularly. Such a character may be a non-player character (NPC) that does not completely receive an operation of the user in the video game, or may be a character that receives an operation of the user in a partial status and does not receive an operation of the user in the other status. As an example of the character that autonomically takes an action, there is one that autonomically recognizes object(s) around it, and makes a decision to take an action against any object.

Further, one or more objects for each of which the character has already stored selection criteria (that is, the selection criterion stored object) means an object or objects for which selection criteria are newly stored or updated on the basis of any event or the like in the video game in addition to an object for which selection criteria are stored by inheritance processing (will be described later). Here, the event includes both a case of indicating information processing that is generated by satisfying a predetermined condition in internal processing of the video game, and a case of indicating an event that is generated for the character or the like in the story of the video game. Further, as initial settings of the video game, there may be an object that is treated as a selection criterion stored object from the beginning for a certain character. Thus, the "event or the like" are used in order to include objects to be treated as the selection criterion stored object on the basis of a condition other than the event. On the other hand, the new object means an object whose selection criteria have not been newly stored and updated yet. Namely, an object that does not have selection criteria as an initial setting and for which selection criteria have not been newly stored, or an object for which selection criteria stored as an initial setting have never been updated is expressed as a new object. Further, the object for which selection criteria have not been newly stored and updated is defined as the new object. However, even an object for which selection criteria have been newly stored and updated may be treated as a new object depending upon conditioning in the video game.

Further, similarity with respect to objects means a state where two objects to be compared with each other have many common points in terms of properties of the objects. The similar object means an object whose degree of similarity satisfies predetermined standards. The extracting unit 11E executes a process of extracting a selection criterion stored object similar to the new object newly obtained by the character as the similar object. A condition to determine whether they are similar to each other or not can be set appropriately.

A method of calculating the degree of similarity can be set in various manners. However, for example, it is conceivable a method of calculating a degree of similarity by calculating a degree of matching in a range of 0 to 100 for each element regarding the properties of the objects, and dividing the total degree of matching obtained by summing up the degrees of matching of all elements by a value obtained by multiplying the number of elements by 100. As one example, in a case where there are three elements regarding the properties of the object including a "size", a "weight", and a "shape", the degree of similarity thereof is calculated on the basis of a formula "(degree of similarity)={(degree of matching of size, [0 to 100])+(degree of matching of weight, [0 to 100])+(degree of matching of shape, [0 to 100]}/(100×3).

Further, a threshold value may be set to the degree of similarity for being extracted as the similar object. The extracting unit 11E may be configured so as not to extract, in a case where a degree of similarity between a target object and a new object is a predetermined threshold value or less, the target object as a similar object. Further, instead of providing the threshold value to the degree of similarity in the extracting unit 11E, the inheriting unit 12E may be configured so as not to execute inheritance processing in a case where the degree of similarity between the extracted similar object and the new object is a predetermined threshold value or less.

The inheriting unit 12E has a function to set a selection probability of each of actions in the selection criteria stored so as to be associated with the new object on the basis of a selection probability of each of actions in the selection criteria stored so as to be associated with the similar object with respect to at least actions set in common between the similar object and the new object.

The inheritance processing is a process of setting selection criteria of a new object on the basis of selection criteria of a similar object. The concrete processing content may be any method so long as it is set on the basis of the selection criteria of the similar object. For example, it is conceivable a process so that a selection probability of each action in selection criteria of a new object approaches a selection probability of each corresponding action in selection criteria of a similar object. As a concrete example of the process, there is a process in which normalization processing is executed so that for at least actions set in common, a value indicating a selection probability of each action in selection criteria of a similar object is added to a value of a selection probability of each corresponding action in selection criteria of a new object and a total of the values of the selection probabilities then becomes 100%. The selection criteria of the new object after the execution of the inheritance processing are stored in the storage device 103 as the selection criteria of the new object regarding the character. In this regard, the new object may be configured so as to include the selection criteria as an initial setting, or may be configured so as not to include selection criteria and store selection criteria only by inheritance processing for the first time.

Figure 13:
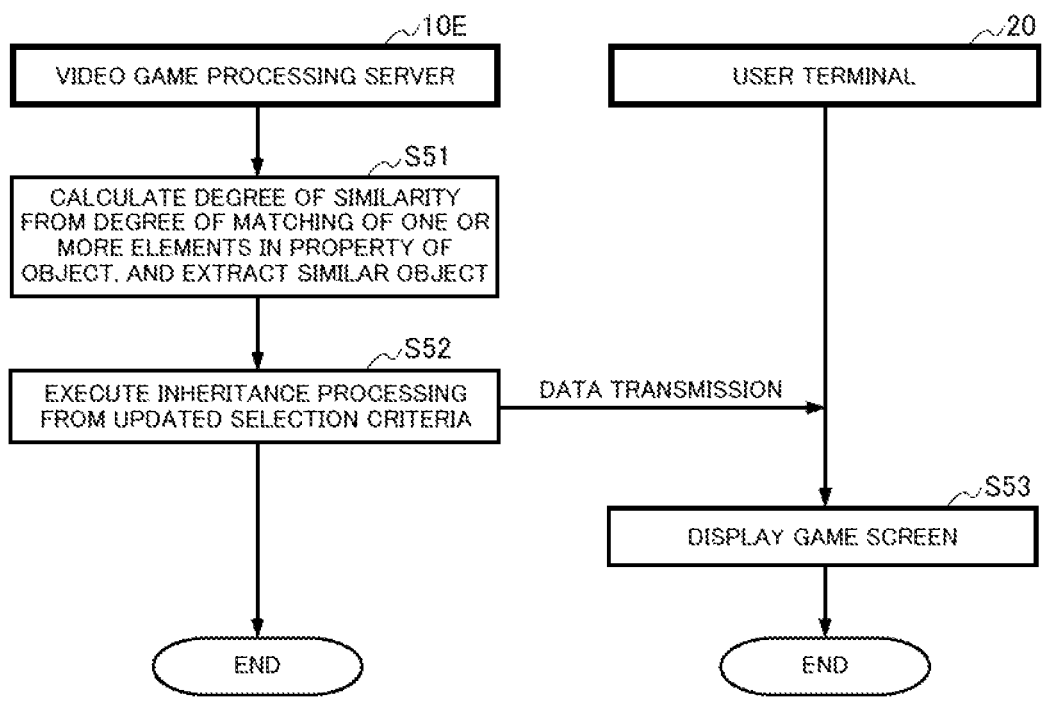
FIG. 13 is a flowchart illustrating an example of game processing corresponding to at least one of the embodiments of the present disclosure.

FIG. 13 is a flowchart illustrating an example of game processing corresponding to at least one of the embodiments of the present disclosure. In the game processing according to the present embodiment, processes related to a control of progress of the video game in response to an operation of the user of a user terminal 20 (hereinafter, referred to as a "terminal 20") are executed. Hereinafter, a case where the server 10E and the terminal 20 execute the game processing will be described as an example. In this regard, a flowchart illustrating an operation of each of the server 10E and the terminal 20 is omitted from a point of view to avoid repeated explanation.

The game processing is started in a case where a start condition of inheritance processing for a new object is satisfied, for example. In a case where the start condition of the inheritance processing for the new object is satisfied, the server 10E first calculates a degree of similarity between the new object and each of one or more selection criterion stored objects in accordance with a degree of matching of one or more elements about properties of the object, which are composed of at least one element, and extracts a similar object on the basis of the degree of similarity (Step S51). Subsequently, the server 10E executes the inheritance processing from selection criteria of the similar object to selection criteria of the new object (Step S52). Subsequently, the server 10E stores the selection criteria of the new object after the inheritance processing is executed, and executes data transmission for reflecting an influence based on execution of the inheritance processing to the user terminal 20. Subsequently, the user terminal 20 receives data after the inheritance processing; causes a predetermined display device to display a game screen to which the inheritance processing is reflected if needed (Step S53); and terminates the processes herein.

Figure 14:
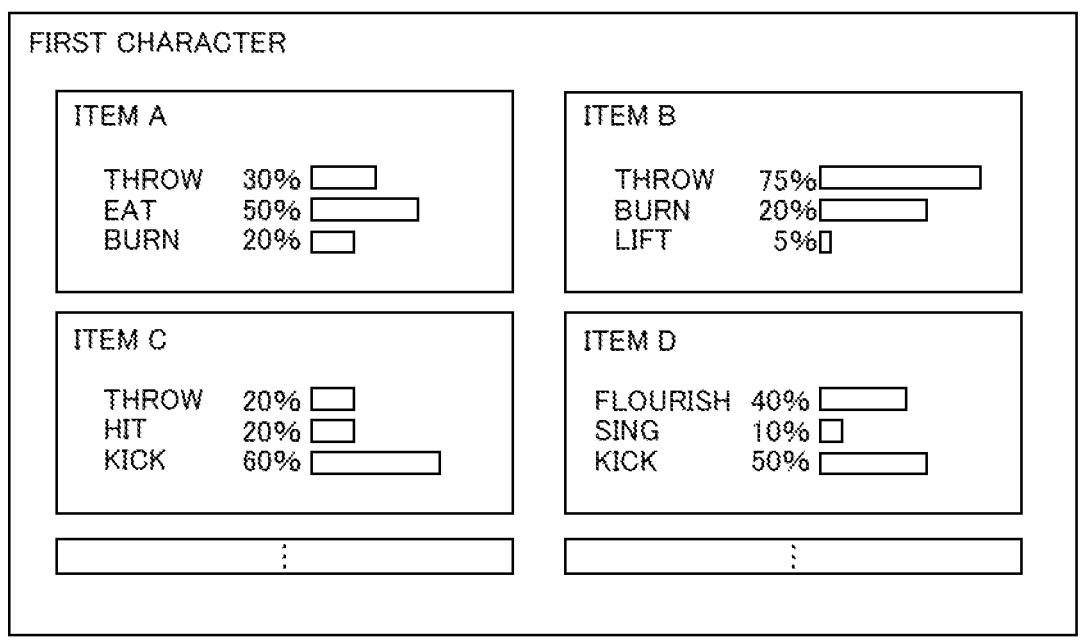
FIG. 14 is an explanatory diagram for explaining one example of information to be used corresponding to at least one of the embodiments of the present disclosure.

Next, explanation will be made on the basis of concrete examples. FIG. 14 to FIG. 17 are explanatory diagrams for explaining one example of information to be used in the game processing corresponding to at least one of the embodiments of the present disclosure. FIG. 14 illustrates one example of selection criteria for a plurality of items stored so as to be associated with a character. For a first character, selection criteria for a plurality of items such as items A, B, C, D, and . . . are stored. In the example illustrated in FIG. 14, it can be seen that actions respectively set to the items A to D are different from each other, and a selection probability is set to each of the actions as the selection criteria. Further, the selection criteria of each of the items are updated on the basis of evaluation thereof each time the item is used, whereby the selection probability thereof changes.

FIG. 15 illustrates one example of item data as one example of data representing properties of an object. In the example illustrated in FIG. 15, a "name", a "size", a "weight", and a "shape" are registered for each of items X to Z as information for managing the properties. In this example illustrated in FIG. 15, three elements including the "size", the "weight", and the "shape" are provided for the properties of the objects. By comparing each of the three elements with the other object, a degree of matching for each element is calculated, and the whole degree of similarity is then calculated from the degree of matching of each of the elements.

FIG. 16 illustrates one example of degrees of similarity of items. Degrees of similarity of the other items with respect to an item A are represented. In comparison between the items A, which are the same items, a degree of similarity of course becomes 100%. However, as a comparison result with each of the other items, an item B has the highest degree of similarity of 80%. For this reason, in this example illustrated in FIG. 16, it is determined that a similar item of the item A is the item B.

FIG. 17 illustrates one example of inheritance processing for selection criteria of items. In FIG. 17, an item A is an inheritance source item that is extracted as a similar item of an item B, and the item B is an inheritance destination item. Further, in FIG. 17, an action in which a selection probability of an item is hatched is illustrated for explaining the inheritance processing, and this means an action that does not exists in the corresponding item. Three actions are set to each of the item A and the item B, and there are two actions common to the two items of "eat" and "burn". In this example of the inheritance processing illustrated in FIG. 17, a value indicating a selection probability of each action common to the inheritance source item and the inheritance destination item is first added. If values respectively indicating selection probabilities of the two actions of "eat" and "burn" are simply added, the values of the respective selection probabilities are 84% and 53%, and the total value of the selection probabilities will be 170%, which is an invalid value. Therefore, normalization processing is executed so that the total value is 100%, whereby two selection probabilities of "eat" and "burn" respectively become 49% and 31%. As a result, it can be said that among the selection criteria of the item B that is the inheritance destination item, values of the selection probabilities of the two common actions of "eat" and "burn" respectively approach values of selection probabilities of the item A, which is the inheritance source item, from initial setting values before the inheritance processing.

Further, a method of the inheritance processing is not limited to the example illustrated in FIG. 17. For example, the method may be a method in which with respect to an action common to an inheritance source item and an inheritance destination item, a selection probability of the inheritance source item is inherited as a selection probability of the inheritance destination item as it is. When this method is applied to the example illustrated in FIG. 17, the selection probabilities of "eat" and "burn" of the item B after the inheritance processing are respectively set to 50% and 20%. In this case, it is necessary to execute normalization processing so that the total value of the selection probabilities becomes 100%. Thus, a selection probability of "lift", which is an action that is not common thereto, is set to 30%.

Further, still another method of the inheritance processing may be a method of in turn adding a predetermined fixed point to a value of a selection probability of an action common to an inheritance destination item in order from an action with the highest selection probability to an action with the lowest selection probability with respect to actions common to an inheritance source item and the inheritance destination item. Further, inheritance in which a relative magnitude relationship of selection probabilities of an action common to an inheritance source item and an inheritance destination item is also conceivable.

In this regard, timing when the inheritance processing is executed may be timing when a character obtains a new object (or timing when the character does not obtain a new object, but first contacts the new object), or may be timing when the new object obtained by the character is actually used.

As explained above, as one side of the fifth embodiment, the server 10E that controls the character in the progress of the video game is configured so as to at least include the selection criterion updating unit 13E, the extracting unit 11E, and the inheriting unit 12E. Thus, the extracting unit 11E extracts the similar object similar to the object newly obtained by the character (that is, the new object) among the one or more objects for each of which the character has already stored the selection criteria (that is, the selection criterion stored object); and the inheriting unit 12E sets the selection probability of each of the actions in the selection criteria stored so as to be associated with the new object on the basis of the selection probability of each of the actions in the selection criteria stored so as to be associated with the similar object with respect to at least actions set in common between the similar object and the new object. Therefore, it becomes possible to set the selection criteria of the new object on the basis of the selection criteria of the similar object.

Namely, by inheriting the selection criteria of the similar object, which is an existing object that has already stored the selection criteria, to the selection criteria of the new object, it becomes possible to bring selection tendency (that is, the selection probability) of an action in the new object closer to selection tendency (that is, the selection probability) of an action in the similar object. Therefore, even though it is a new object, it is possible to realize a process that meets expectation of the user to want to be able to cause the character to use the new object whose degree of similarity to an existing object is high in the similar manner to that of the existing object.

As explained above, one shortage or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, and 201 to 20N and the server 10 executes the various kinds of processing described above in accordance with various kinds of control programs (for example, a video game processing program) stored in the storage device with which the corresponding terminal or server is provided.

Further, the configuration of the video game processing system 100 is not limited to the configuration that has been explained as an example of each of the embodiments described above. For example, the system 100 may be configured so that the server 10 executes a part or all of the processes that have been explained as the processes executed by the user terminal 20. Alternatively, the system 100 may be configured so that any of the plurality of user terminals 20, and 201 to 20N (for example, the user terminal 20) executes a part or all of the processes that have been explained as the processes executed by the server 10. Further, the system 100 may be configured so that a part or all of the storage unit included in the server 10 is included in any of the plurality of user terminals 20, and 201 to 20N. Namely, the system 100 may be configured so that a part or all of the functions of any one of the user terminal 20 and the server 10 according to the system 100 is included in the other.

Further, the system 100 may be configured so that the program causes a single apparatus to perform a part or all of the functions that have been explained as the example of each of the embodiments described above without including a communication network.

APPENDIX

The explanation of the embodiments described above has been described so that the following disclosure can be at least performed by a person having a normal skill in the art to which the present disclosure belongs.

(1)

A non-transitory computer-readable medium including a video game processing program for causing a server to perform functions to select an action regarding an object of a character on a basis of predetermined selection criteria, at least one usage purpose being set to the object as an action, the functions comprising:

an extracting function configured to extract a similar object similar to an object newly obtained by a character as a new object among one or more objects as selection criterion stored objects, the character having already stored selection criteria for each of the selection criterion stored objects; and an inheriting function configured to set a selection probability of each of actions in the selection criteria stored so as to be associated with the new object on a basis of a selection probability of each of actions in the selection criteria stored so as to be associated with the similar object with respect to at least actions set in common between the similar object and the new object.

(2)

The non-transitory computer-readable medium according to (1), the functions further comprising:

a selection criterion updating function configured to update and store, when the character carries out an action against the object, a selection probability of each of the actions in the selection criteria regarding the object on a basis of evaluation for the action.

(3)

The non-transitory computer-readable medium according to (1) or (2), wherein the inheriting function is configured to execute inheritance processing for a selection probability of an action that can be carried out in common between the similar object and the new object.

(4)

The non-transitory computer-readable medium according to any one of (1) to (3), wherein the extracting function is configured to calculate a degree of similarity between the new object and each of one or more objects of the selection criterion stored objects in accordance with a degree of matching of one or more elements about properties of an object composed of at least one element, and extract the similar object on a basis of the degree of similarity.

(5)

The non-transitory computer-readable medium according to (4), wherein the at least one element includes an element of a size of the object as the element used for calculation of the degree of similarity, and wherein the extracting function is configured to calculate a degree of matching of the elements on a basis of a comparison result of the sizes of the objects.

(6)

The non-transitory computer-readable medium according to (4) or (5), wherein the at least one element includes an element of a weight of the object as the element used for calculation of the degree of similarity, and wherein the extracting function is configured to calculate the degree of matching of the elements on a basis of a comparison result of the weights of the objects.

(7)

The non-transitory computer-readable medium according to any one of (4) to (6), wherein the at least one element includes an element of a shape of the object as the element used for calculation of the degree of similarity, and wherein the extracting function is configured to calculate the degree of matching of the elements on a basis of a comparison result of the shapes of the objects.

(8)

The non-transitory computer-readable medium according to any one of (4) to (7), wherein the inheriting function is configured not to execute inheritance processing in a case where the degree of similarity between the new object and the extracted similar object is a predetermined threshold value or less.

(9)

The non-transitory computer-readable medium according to any one of (4) to (7), wherein the extracting function is configured not to extract a target object as the similar object in a case where the degree of similarity between the target object and the new object is a predetermined threshold value or less.

(10)

A non-transitory computer-readable medium including a video game processing program for causing a user terminal to perform at least one function of the functions that the video game processing program described in any one of (1) to (9) causes the server to perform, the user terminal being capable of communicating with the server.

(11)

A video game processing system for performing functions to select an action regarding an object of a character on a basis of predetermined selection criteria, at least one usage purpose being set to the object as an action, the video game processing system comprising a communication network, a server, and a user terminal, the video game processing system further comprising:

an extractor configured to extract a similar object similar to an object newly obtained by a character as a new object among one or more objects as selection criterion stored objects, the character having already stored selection criteria for each of the selection criterion stored objects; and an inheritor configured to set a selection probability of each of actions in the selection criteria stored so as to be associated with the new object on a basis of a selection probability of each of actions in the selection criteria stored so as to be associated with the similar object with respect to at least actions set in common between the similar object and the new object.

(12)

The video game processing system according to (11), wherein the server includes the extractor and the inheritor, and wherein the user terminal includes an output controller configured to output a game screen to a display screen of a display device, the game screen indicating a result obtained by using the selection criteria stored so as to be associated with the new object.

(13)

A non-transitory computer-readable medium including a video game processing program for causing a user terminal to perform functions to select an action regarding an object of a character on a basis of predetermined selection criteria, at least one usage purpose being set to the object as an action, the functions comprising:

an extracting function configured to extract a similar object similar to an object newly obtained by a character as a new object among one or more objects as selection criterion stored objects, the character having already stored selection criteria for each of the selection criterion stored objects; and an inheriting function configured to set a selection probability of each of actions in the selection criteria stored so as to be associated with the new object on a basis of a selection probability of each of actions in the selection criteria stored so as to be associated with the similar object with respect to at least actions set in common between the similar object and the new object.

(14)

A video game processing method of performing processes to select an action regarding an object of a character on a basis of predetermined selection criteria, at least one usage purpose being set to the object as an action, the video game processing method comprising:

an extracting process configured to extract a similar object similar to an object newly obtained by a character as a new object among one or more objects as selection criterion stored objects, the character having already stored selection criteria for each of the selection criterion stored objects; and an inhering process configured to set a selection probability of each of actions in the selection criteria stored so as to be associated with the new object on a basis of a selection probability of each of actions in the selection criteria stored so as to be associated with the similar object with respect to at least actions set in common between the similar object and the new object.

(15)

A video game processing method of performing processes to select an action regarding an object of a character on a basis of predetermined selection criteria by a video game processing system, at least one usage purpose being set to the object as an action, the video game processing system comprising a communication network, a server, and a user terminal, the video game processing method comprising:

an extracting process configured to extract a similar object similar to an object newly obtained by a character as a new object among one or more objects as selection criterion stored objects, the character having already stored selection criteria for each of the selection criterion stored objects; and an inhering process configured to set a selection probability of each of actions in the selection criteria stored so as to be associated with the new object on a basis of a selection probability of each of actions in the selection criteria stored so as to be associated with the similar object with respect to at least actions set in common between the similar object and the new object.

INDUSTRIAL APPLICABILITY

According to one of the embodiments of the present disclosure, it is useful to be capable of causing an action of a character for achieving a predetermined object in a video game to have the variety while suppressing an increase in the burden on developers.

What is claimed is:

1. A non-transitory computer-readable medium storing a video game processing program for causing a server to perform functions comprising:
    selecting at least one action regarding an object of a character based on predetermined selection criteria;
    extracting a similar object similar to the new object newly obtained by a character among one or more selection criterion stored objects, the character having already stored selection criteria for each of the selection criterion stored objects; and
    executing an inheritance process including setting a selection probability of each of actions in the selection criteria to be stored in association with the new object based on a selection probability of each of the actions in the selection criteria stored in association with the similar object, the actions being at least actions selected for the similar object and the new object.

2. The non-transitory computer-readable medium according to claim 1, the functions further comprising:
    updating and storing selection probability of each of the actions in the selection criteria regarding the object based on evaluation for an action, when the character performs the action with respect to the object.

3. The non-transitory computer-readable medium according to claim 1, the functions further comprising:
    executing the inheritance process for a selection probability of an action that is common between the similar object and the new object.

4. The non-transitory computer-readable medium according to claim 1, the functions further comprising:
    calculating a degree of similarity between the new object and each of one or more objects of the selection criterion stored objects in accordance with a degree of matching of one or more items about properties of an object including at least one item; and
    extracting the similar object based on the degree of similarity.

5. The non-transitory computer-readable medium according to claim 4,
    wherein the at least one item includes a size of the object, and
    wherein calculating the degree of similarity comprises calculating the degree of matching based on a comparison result of the sizes of the new object and each of the one or more objects of the selection criterion stored objects.

6. The non-transitory computer-readable medium according to claim 4,
    wherein the at least one item includes a weight of the object, and
    wherein calculating the degree of similarity comprises calculating the degree of matching based on a comparison result of the weights of the new object and each of the one or more objects of the selection criterion stored objects.

7. The non-transitory computer-readable medium according to claim 4,
    wherein the at least one item includes a shape of the object, and
    wherein calculating the degree of similarity comprises calculating the degree of matching based on a comparison result of the shapes of the new object and each of the one or more objects of the selection criterion stored objects.

8. The non-transitory computer-readable medium according to claim 4, further comprising:
    suppressing the inheritance process, if the degree of similarity between the new object and the extracted similar object is equal to or less than a predetermined threshold value.

9. The non-transitory computer-readable medium according to claim 4,
    wherein extracting a target object as the similar object, if the degree of similarity between the target object and the new object is equal to or less than a predetermined threshold value.

10. A video game processing system comprising:
    a communication network;
    a server;
    at least one user terminal that is configured to connect with the server via the communication network; and
    a computer configured to:
        select an action regarding an object of a character based on predetermined selection criteria;
        extract a similar object similar to a new object newly obtained by a character among one or more selection criterion stored objects, the character having already stored selection criteria for each of the selection criterion stored objects; and
        set a selection probability of each of actions in the selection criteria to be stored in association with the new object based on of a selection probability of each of the actions in the selection criteria stored in association with the similar object, the action being selected for the similar object and the new object.

11. A non-transitory computer-readable medium storing a video game processing program for causing a user terminal to perform functions comprising:
- selecting at least one action regarding an object of the character based on predetermined selection criteria;
- extracting a similar object similar to a new object newly obtained by a character among one or more selection criterion stored objects, the character having already stored selection criteria for each of the selection criterion stored objects; and
- setting a selection probability of each of actions in the selection criteria to be stored in association with the new object based on a selection probability of each of the actions in the selection criteria stored in association with the similar object, the actions being at least actions selected for the similar object and the new object.

* * * * *

UNITED STATES PATENT AND TRADEMARK OFFICE
CERTIFICATE OF CORRECTION

PATENT NO. : 11,878,248 B2
APPLICATION NO. : 17/545703
DATED : January 23, 2024
INVENTOR(S) : Shinpei Sakata et al.

It is certified that error appears in the above-identified patent and that said Letters Patent is hereby corrected as shown below:

In the Claims

| | Reads | Should Read |
|---|---|---|
| Column 21, Line 45 | extracting a similar object similar to the new object newly obtained by a character | extracting a similar object similar to a new object newly obtained by the character |
| Column 22, Line 58 | new object newly obtained by a character | new object newly obtained by the character |
| Column 23, Line 4 | selecting at least one action regarding an object of the character | selecting at least one action regarding an object of a character |

Signed and Sealed this
Sixteenth Day of April, 2024

Katherine Kelly Vidal
Director of the United States Patent and Trademark Office